(12) United States Patent
Nishimura et al.

(10) Patent No.: US 9,664,890 B2
(45) Date of Patent: May 30, 2017

(54) VARIABLE WAVELENGTH INTERFERENCE FILTER, OPTICAL MODULE, AND OPTICAL ANALYZER

(71) Applicant: Seiko Epson Corporation, Tokyo (JP)

(72) Inventors: Teruyuki Nishimura, Matsumoto (JP); Akira Sano, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/540,318

(22) Filed: Nov. 13, 2014

(65) Prior Publication Data

US 2015/0070767 A1    Mar. 12, 2015

Related U.S. Application Data

(62) Division of application No. 13/372,946, filed on Feb. 14, 2012, now Pat. No. 8,917,451.

(30) Foreign Application Priority Data

Feb. 15, 2011  (JP) ................................. 2011-029490

(51) Int. Cl.
*G02B 26/00* (2006.01)
*G01J 3/26* (2006.01)
(Continued)

(52) U.S. Cl.
CPC .............. *G02B 26/001* (2013.01); *G01J 3/26* (2013.01); *G01J 3/50* (2013.01); *G02B 26/06* (2013.01)

(58) Field of Classification Search
CPC ........ G02B 26/001; G02B 5/28; G02B 5/284; G02B 5/285; G02B 5/201; G02B 1/11;
(Continued)

(56) References Cited

U.S. PATENT DOCUMENTS 5,561,523 A    10/1996  Blomberg et al.
2002/0172031 A1    11/2002  Masuda
(Continued)

FOREIGN PATENT DOCUMENTS

CN    101900877 A    12/2010
JP    07-286809    10/1995
(Continued)

*Primary Examiner* — Scott J Sugarman
*Assistant Examiner* — Sharrief Broome
(74) *Attorney, Agent, or Firm* — Harness, Dickey & Pierce, P.L.C.

(57) ABSTRACT

A variable wavelength interference filter includes: a first reflective film disposed on a face of a first substrate facing a second substrate; a second reflective film disposed on a face of the second substrate facing the first substrate and the first reflective film; a first electrode disposed on the face of the first substrate; and a second electrode disposed on the face of the second substrate. The second substrate includes a movable portion on which the second reflective film is disposed and a connection maintaining portion maintaining the movable portion to be movable in a substrate thickness direction, the connection maintaining portion circumscribes the movable portion and is thinner than the movable portion, and the second electrode is disposed on a portion of the second substrate that is thicker than the connection maintaining portion.

17 Claims, 7 Drawing Sheets

(51) Int. Cl.
*G01J 3/50* (2006.01)
*G02B 26/06* (2006.01)

(58) Field of Classification Search
CPC ........ G02B 1/115; G02B 1/005; G02B 1/105;
G02B 27/0006; G02B 27/142; G02B
5/287; G02B 5/288; G02B 1/116; G02B
26/007; G02B 5/008; G02B 5/08; G02B
5/0841
USPC .......................... 359/581, 587, 589, 578, 585
See application file for complete search history.

(56) References Cited

U.S. PATENT DOCUMENTS

| | | | |
|---|---|---|---|
| 2005/0018272 A1* | 1/2005 | Kimura | G02B 26/02 359/295 |
| 2007/0242920 A1* | 10/2007 | Lin | G01J 3/26 385/27 |
| 2010/0142067 A1 | 6/2010 | Hanamura et al. | |
| 2010/0302660 A1 | 12/2010 | Hirokubo et al. | |
| 2012/0050869 A1 | 3/2012 | Nishimura et al. | |

FOREIGN PATENT DOCUMENTS

| | | |
|---|---|---|
| JP | 11-142752 | 5/1999 |
| JP | 2003-185941 A | 7/2003 |
| JP | 2003-215473 A | 7/2003 |
| JP | 2006-349775 A | 12/2006 |
| JP | 2008-116669 A | 5/2008 |
| JP | 2009-134028 A | 6/2009 |
| JP | 2009-251105 A | 10/2009 |
| JP | 2010-008644 A | 1/2010 |
| JP | 2010-139552 A | 6/2010 |
| JP | 5707780 B2 | 4/2015 |
| JP | 5999213 B2 | 9/2016 |

* cited by examiner

VARIABLE WAVELENGTH INTERFERENCE FILTER, OPTICAL MODULE, AND OPTICAL ANALYZER

CROSS-REFERENCE TO RELATED APPLICATIONS

This is a divisional patent application of U.S. application Ser. No. 13/372,946 filed Feb. 14, 2012 which claims priority to Japanese Patent Application No. 2011-029490 filed Feb. 15, 2011, all of which are incorporated by reference herein in their entireties.

BACKGROUND

1. Technical Field

The present invention relates to a variable wavelength interference filter that selects and outputs light of a desired target wavelength from incident light, an optical module that includes the variable wavelength interference filter, and an optical analyzer that includes the optical module.

2. Related Art

Generally, a variable wavelength interference filter is known in which reflective films are arranged on the opposing faces of two substrates so as that the reflective films face each other across a gap having a predetermined dimension (for example, see JP-A-7-286809).

In the variable wavelength interference filter disclosed in JP-A-7-286809, driving electrodes are arranged on the faces of two substrates so as to face each other, and, by applying driving voltages to the driving electrodes, a gap interval can be adjusted in accordance with an electrostatic attractive force. Here, one substrate includes a low-rigidity portion located on the periphery of the reflective film. The low-rigidity portion is formed to be thinner than that of the other portions of the substrate and the driving electrode is also disposed on this low-rigidity portion. In accordance with the transformation of the low-rigidity portion, the flatness of the reflective film disposed on one substrate is secured. According to such a configuration, the variable wavelength interference filter can transmit light of a predetermined wavelength in accordance with the gap interval.

Since the variable wavelength interference filter transmits light of a desired wavelength by adjusting the gap interval, high gap precision is required.

However, when the driving electrode is formed on the substrate, an internal stress acts on the driving electrode in the facial direction (a direction extending along the substrate surface) of the driving electrode. The magnitude of the internal stress and the direction in which the stress acts are dictated based on the method of forming the driving electrode as a film, the material of the film, and the like. Here, in a case where compressive stress acts on the driving electrode formed on one substrate, the substrate is convexly bent toward the other substrate. On the other hand, in a case where tensile stress is applied to the driving electrode formed on one substrate, the substrate is convexly bent in a direction away from the other substrate. Particularly, since the low rigidity portion of the substrate has lower rigidity than the other portions, in a case where the driving electrode is formed on the low-rigidity portion, there is a concern that the amount of bending of the substrate may be large.

When the substrate is bent in accordance with the internal stress of the above driving electrode, in an initial state in which no driving voltage is applied to the driving electrode, there is a problem in that bending also occurs in the reflective film so as to decrease the resolving power of the variable wavelength interference filter.

SUMMARY

An advantage of some aspects of the invention is that it provides a variable wavelength interference filter, an optical module, and an optical analyzer of which the resolving power is improved by decreasing the bending occurring in the substrate.

An aspect of the invention is directed to a variable wavelength interference filter including: a first substrate that has transparency; a second substrate that faces the first substrate and has transparency; a first reflective film that is disposed on a face (surface) of the first substrate that faces the second substrate; a second reflective film that is disposed on a face (surface) of the second substrate that faces the first substrate and faces the first reflective film across a gap; a first electrode that is disposed on the face of the first substrate that faces the second substrate; and a second electrode that is disposed on the face of the second substrate that faces the first substrate and faces the first electrode. The second substrate includes a movable portion on which the second reflective film is disposed and a connection maintaining portion that maintains the movable portion so as to be movable in a substrate thickness direction, the connection maintaining portion is continuously formed so as to enclose (that is, to encircle or circumscribe) the movable portion and is formed to have a thickness size smaller than that of the movable portion, and the second electrode is disposed on a portion of the second substrate that has a thickness size larger than the connection maintaining portion.

Here, since the connection maintaining portion of the second substrate is formed to have a thickness smaller than that of the movable portion, the rigidity of the connection maintaining portion is lower than the rigidity of the movable portion.

According to the above-described variable wavelength interference filter, the second electrode is disposed on a portion of the second substrate that has a thickness size that is larger than that of the connection maintaining portion of the second substrate. Thus, since the second electrode (film) is not formed in the connection maintaining portion, the internal stress of the second electrode does not act on the connection maintaining portion. Accordingly, the bending of the substrate that occurs due to the internal stress can be decreased. Therefore, the bent state of the reflective film due to the bending of the substrate can be suppressed, whereby the resolving power of the variable wavelength interference filter can be improved.

In the above-described variable wavelength interference filter, it is preferable that the second electrode is disposed on the movable portion.

According to this configuration, since the second electrode is disposed on the movable portion that is maintained so as to be movable in the substrate thickness direction, even in a case where the electrostatic attractive force generated by applying voltages to the first electrode and the second electrode is low, the movable portion can be moved to the first substrate side in accordance with the electrostatic attractive force. Accordingly, the voltage applied to each electrode may be low, whereby the power consumption of the variable wavelength interference filter can be suppressed.

In the above-described variable wavelength interference filter, it is preferable that a support portion that is formed to have a thickness size larger than that of the connection maintaining portion and supports the connection maintaining portion is further included, the second electrode includes an inner electrode that is formed so as to enclose (circumscribe) the second reflective film and an outer electrode that is formed so as to enclose (circumscribe) the inner electrode, the inner electrode is disposed on the movable portion, and the outer electrode is disposed on the support portion.

According to this configuration, since the inner electrode of the second electrode is disposed on the movable portion, and the outer electrode of the second electrode is disposed on the support portion, the inner stress applied to the movable portion by the second electrode can be lower than that of a case where both the electrodes are disposed on the movable portion. Therefore, the bending of the substrate can be decreased even further.

In addition, since only the inner electrode of the second electrode is disposed on the movable portion, the weight applied to the movable portion can be suppressed as compared to a case where the inner electrode and the outer electrode are both disposed on the movable portion. Accordingly, since the inertia of the movable portion can be low, the responsiveness of the reflective film at the time of driving can be improved.

In the above-described variable wavelength interference filter, it is preferable that an anti-bending film that is disposed on a face located on a side opposite to the face of the second substrate that faces the first substrate is further included, and a direction in which internal stress acts in a facial direction of the anti-bending film and a direction in which internal stress acts in a facial direction of the second reflective film and the second electrode are the same.

According to this configuration, the anti-bending film is formed on the face located on the side opposite to the face of the second substrate that faces the first substrate, and the internal stress of the anti-bending film is formed in the same direction as the direction of the internal stress of the second reflective film or the second electrode. For example, the bending moment acting on the second substrate based on the compressive stress of the anti-bending film offsets the bending moment caused by the compressive stress of the second reflective film or the second electrode that causes the second substrate to be convexly bent toward the first substrate. Accordingly, the bending of the second substrate can be further decreased, whereby the resolving power of the variable wavelength interference filter can be improved further.

Another aspect of the invention is directed to an optical module including: the above-described variable wavelength interference filter; and a light receiving unit that receives test target light transmitted through the variable wavelength interference filter.

According to the above-described optical module, similarly to the above-described variable wavelength interference filter, the bent state of the second reflective film due to the bending of the second substrate is suppressed, whereby the resolving power of the variable wavelength interference filter can be improved. In accordance with this, light of a desired wavelength can be spectrally dispersed with high precision. Accordingly, by receiving light output from the variable wavelength interference filter by using the light receiving unit, the optical module can measure a precise amount of a light component of a desired wavelength included in the test target light.

Still another aspect of the invention is directed to an optical analyzer including: the above-described optical module; and an analysis processing unit that analyzes optical characteristics of the test target light based on the light received by the light receiving unit of the optical module.

According to the above-described optical analyzer, since optical module including the above-described variable wavelength interference filter is included, the light amount can be measured with high precision. Thus, by performing an optical analyzing process based on the measurement result, the optical characteristics can be precisely analyzed.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment according to the invention will be described with reference to the drawings.

1. Schematic Configuration of Colorimetric Apparatus

Figure 1:
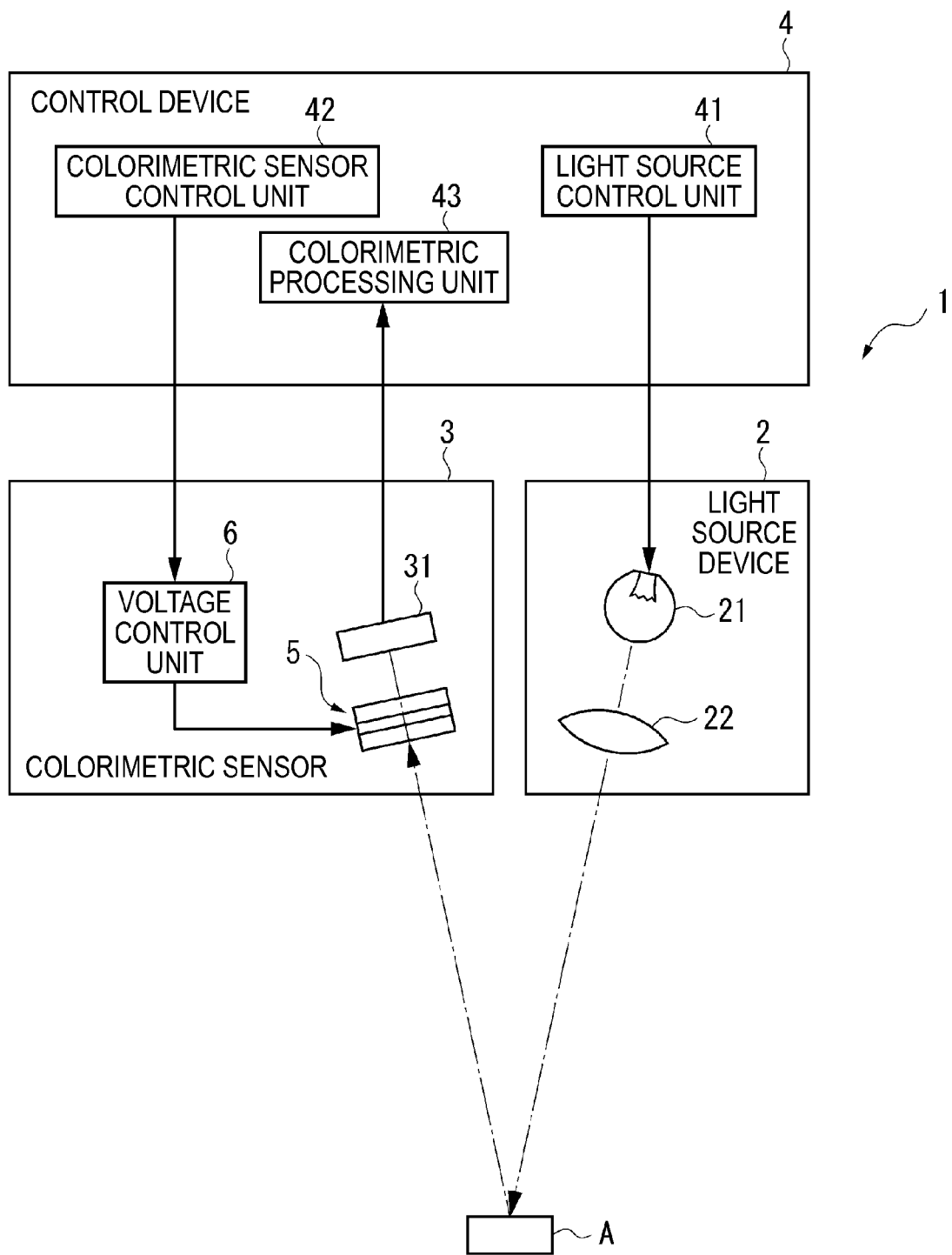
FIG. 1 is a diagram showing a schematic configuration of a colorimetric apparatus according to a first embodiment of the invention.

FIG. 1 is a diagram showing a schematic configuration of a colorimetric apparatus (optical analyzer) including the variable wavelength interference filter according to the first embodiment of the invention.

The colorimetric apparatus 1, as shown in FIG. 1, includes a light source device 2 that emits light onto a test target A, a colorimetric sensor 3 (an optical module according to the embodiment of the invention), and a control device 4 that controls the overall operation of the colorimetric apparatus 1. The colorimetric apparatus 1 is an apparatus that reflects light emitted from the light source device 2 on the test target A, receives reflected test target light by using the colorimetric sensor 3, and analyzes and measures the chromaticity of the test target light, that is, the color of the test target A based on a detection signal output from the colorimetric sensor 3.

2. Configuration of Light Source Device

The light source device 2 includes a light source 21 and a plurality of lenses 22 (only one lens is shown in FIG. 1) and emits white light onto the test target A. A collimator lens is included in the plurality of lenses 22, and the light source device 2 forms the white light emitted from the light source 21 to be parallel light by using the collimator lens and emits the parallel light from a projection lens not shown in the figure toward the test target A.

3. Configuration of Colorimetric Sensor

The colorimetric sensor 3, as shown in FIG. 1, includes: an etalon 5 (a variable wavelength interference filter according to the embodiment of the invention); a light receiving element 31 that receives light transmitted through the etalon 5 as a light receiving unit; and a voltage control unit 6 that changes the wavelength of light transmitted through the etalon 5. In addition, the colorimetric sensor 3 includes an incidence optical lens, which is not shown in the figure, guiding the reflection light (test target light) reflected by the test target A to the inside of the colorimetric sensor 3 at a position facing the etalon 5. In addition, in the colorimetric sensor 3, light of a predetermined wavelength is spectrally dispersed out of the test target light incident from the incidence optical lens from the etalon 5, and the spectrally dispersed light is received by the light receiving element 31.

The light receiving element 31 is configured by a plurality of photoelectric conversion elements and generates an electric signal corresponding to the amount of received light. In addition, the light receiving element 31 is connected to the control device 4 and outputs the generated electric signal to the control device 4 as a light reception signal.

3-1. Configuration of Etalon

Figure 2:
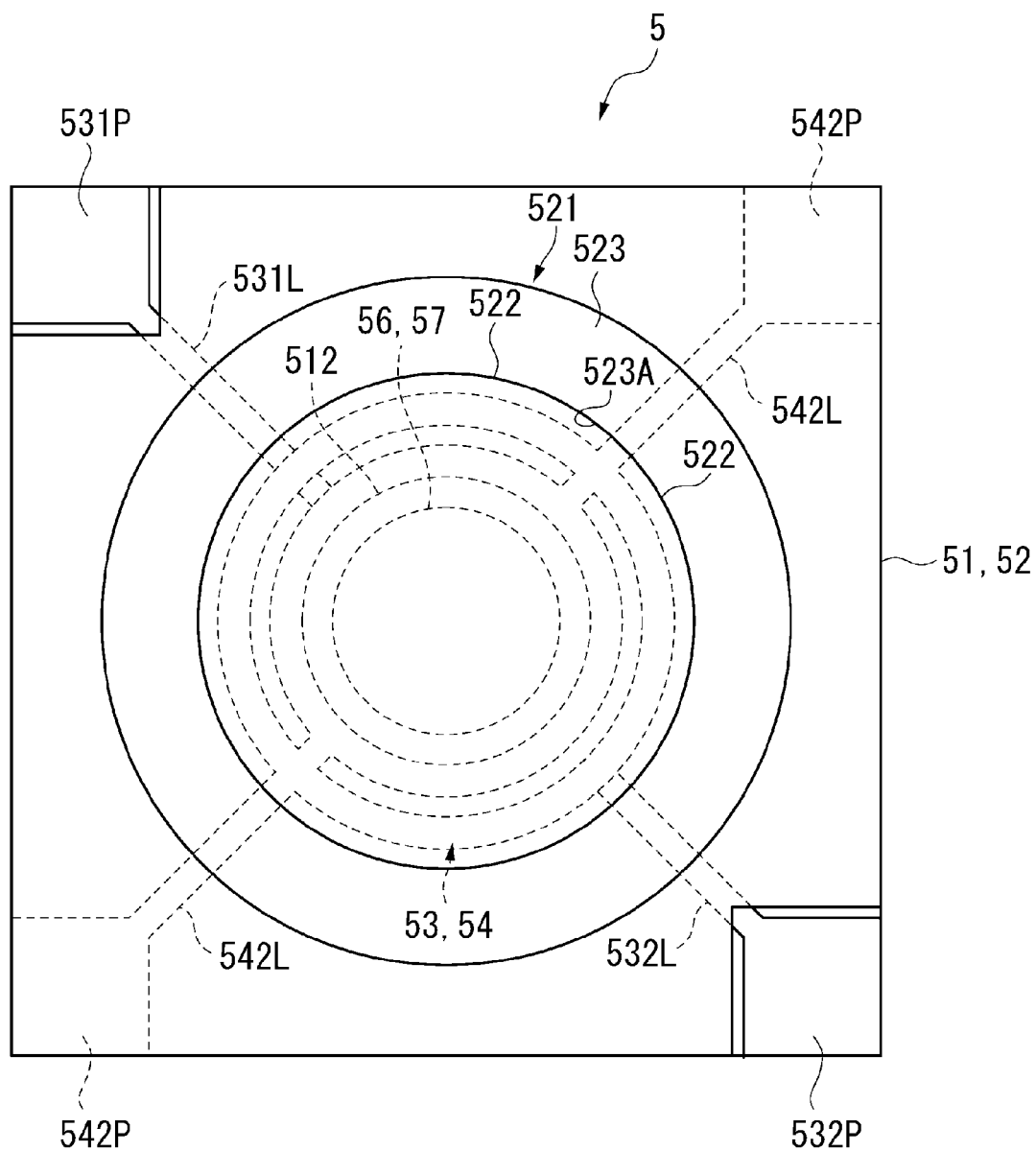
FIG. 2 is a plan view showing a schematic configuration of an etalon according to the first embodiment.
Figure 3:
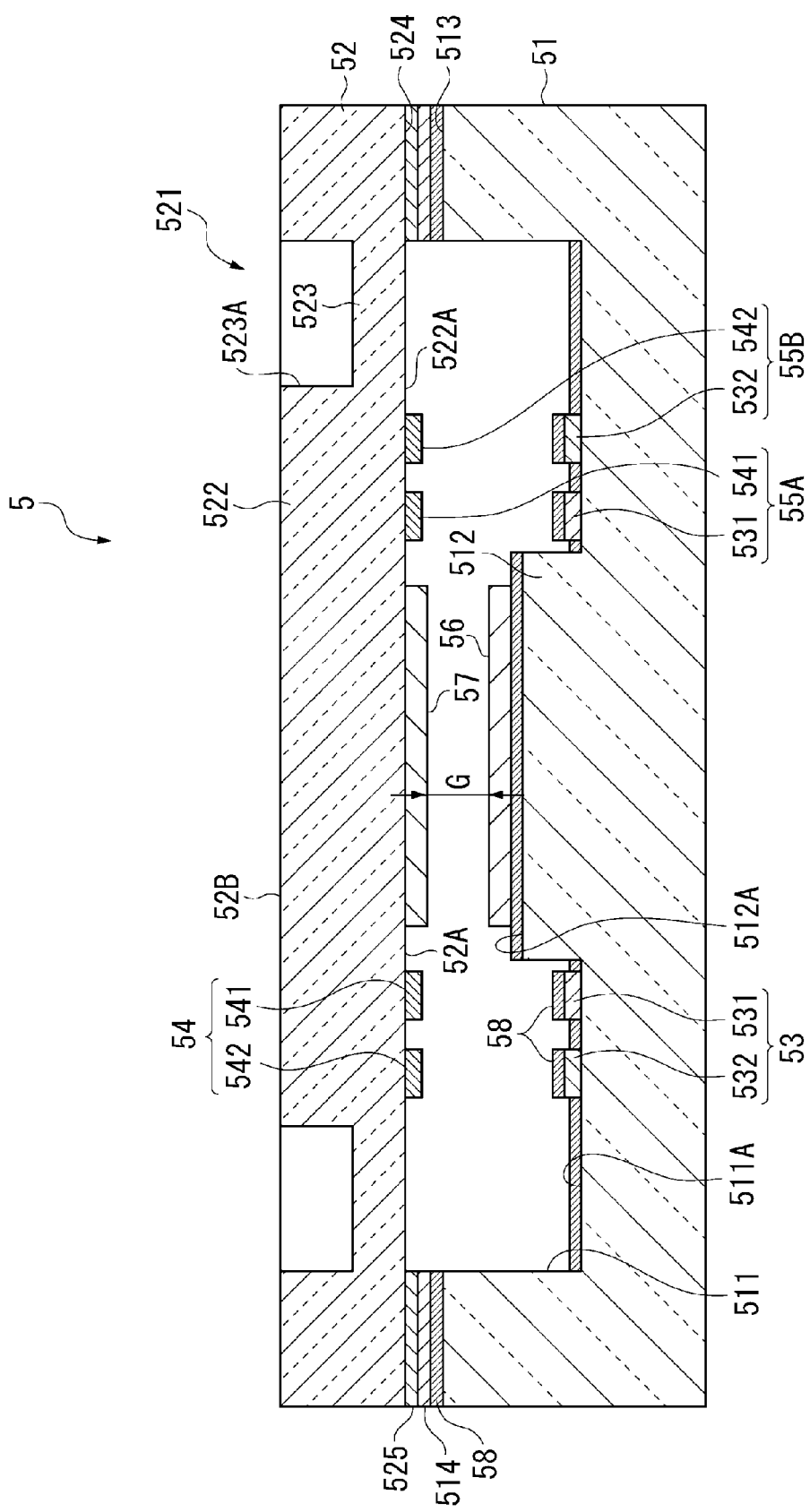
FIG. 3 is a cross-sectional view showing a schematic configuration of the etalon according to the first embodiment.

FIG. 2 is a plan view showing a schematic configuration of the etalon 5, and FIG. 3 is a cross-sectional view showing a schematic configuration of the etalon 5. In FIG. 3, it is assumed that the test target light is incident from the lower side of the figure.

The etalon 5, as shown in FIG. 2, is a plate-shaped optical member having a square shape, and, for example, one side thereof is formed to have a length of 10 mm. The etalon 5, as shown in FIG. 3, includes a first substrate 51 and a second substrate 52. In this embodiment, for these two substrates 51 and 52, a quartz crystal glass base formed from $SiO_2$ (silicon dioxide) is used. In addition, the substrates 51 and 52, for example, may be formed from various kinds of glass such as soda glass, crystalline glass, lead glass, potassium glass, borosilicate glass, and alkali-free glass, a quartz crystal, and the like. Among such materials, as the material configuring the substrates 51 and 52, glass that contains alkaline metal such as sodium (Na) or potassium (K) may be used. By forming the substrates 51 and 52 by using such glass, it is possible to improve the adhesiveness between mirrors 56 and 57 and electrodes 53 and 54, which will be described later, and the bonding strength between the substrates 51 and 52. These two substrates 51 and 52 are integrally formed by bonding together the bonding faces 513 and 524 to be described later.

Between the first substrate 51 and the second substrate 52, a fixed mirror 56 as a first reflective film and a movable mirror 57 as a second reflective film are disposed. Here, the fixed mirror 56 is fixed to a face of the first substrate 51 that faces the second substrate 52, and the movable mirror 57 is fixed to a face 52A of the second substrate 52 that faces the first substrate 51. In addition, the fixed mirror 56 and the movable mirror 57 are arranged so as to face each other across an inter-mirror gap G.

In addition, between the first substrate 51 and the second substrate 52, a first electrostatic actuator 55A and a second electrostatic actuator 55B, which are used for adjusting the dimension of the inter-mirror gap G between the fixed mirror 56 and the movable mirror 57, are disposed.

3-1-1. Configuration of First Substrate

The first substrate 51 is formed by processing a quartz crystal glass base ($SiO_2$: silicon dioxide), for example, having a thickness of 500 μm through etching. More specifically, as shown in FIGS. 3 and 4, an electrode forming groove 511 and a mirror fixing portion 512 are formed in the first substrate 51 through etching.

Figure 4:
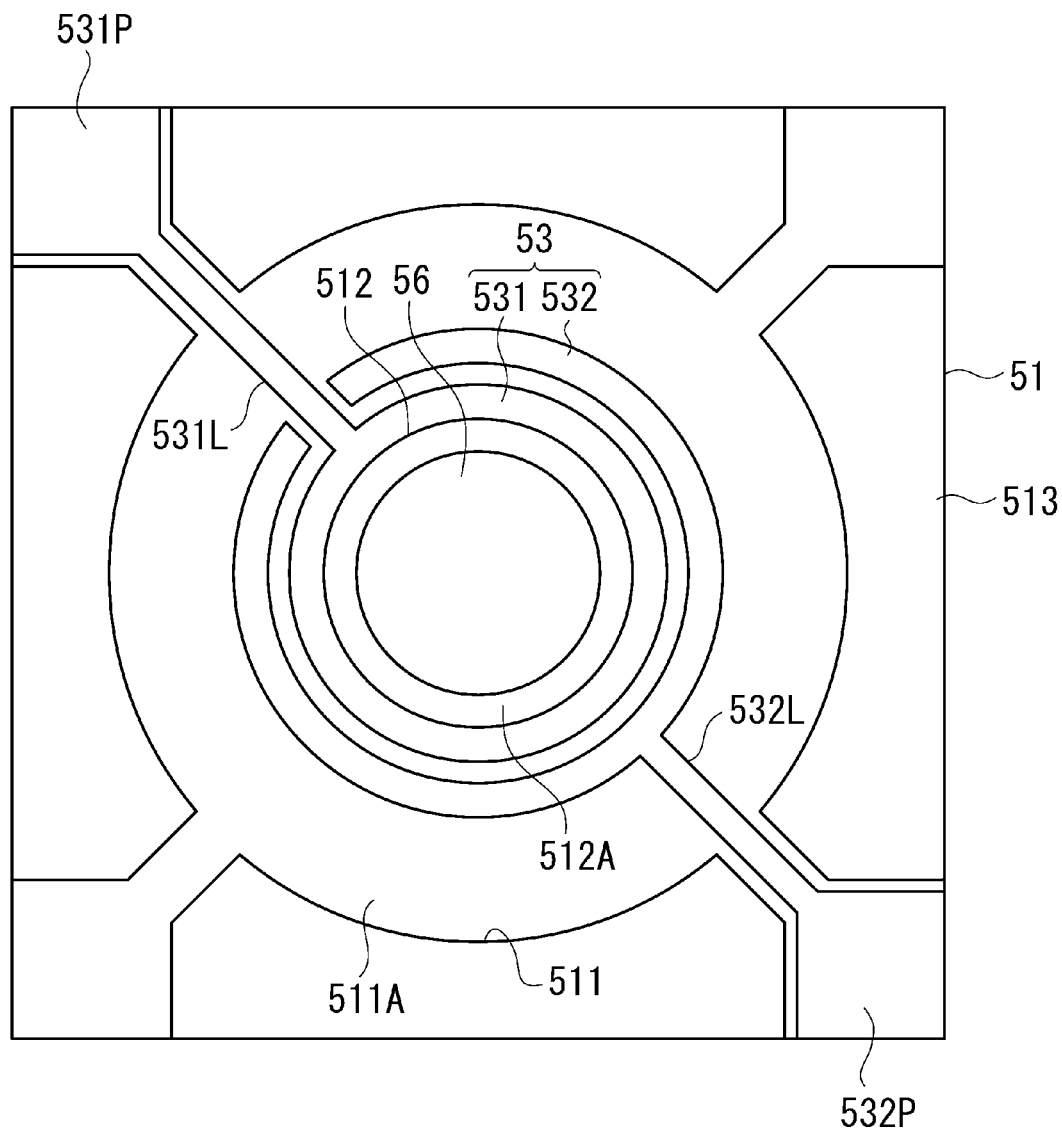
FIG. 4 is a plan view of a first substrate according to the first embodiment, as viewed from the second substrate side.

The electrode forming groove 511, in the plan view (hereinafter, referred to as an etalon plan view) viewed in the thickness direction of the etalon 5 as shown in FIG. 4, is formed in a circle-shape having the planar center point as its center.

The mirror fixing portion 512, in the etalon plane view, is formed so as to protrude from the center portion of the electrode forming groove 511 to the second substrate 52 side.

In the electrode forming groove 511, as shown in FIGS. 3 and 4, between the outer peripheral edge of the mirror fixing portion 512 and the inner circumferential wall face of the electrode forming groove 511, an electrode fixing face 511A having a ring shape is formed, and the first electrode 53 is formed in the electrode fixing face 511A. This first electrode 53 includes an inner first electrode 531 and an outer first electrode 532. The inner first electrode 531, in the etalon plan view (a plan view of the first substrate 51 viewed from the second substrate 52 side) shown in FIG. 4, is formed in the shape of a ring having the center of the fixed mirror 56 as its center point. The outer first electrode 532, in the etalon plan view, on the same axis as that of the inner first electrode 531, is formed in the shape of a letter "C" having a diameter size larger than that of the inner first electrode 531.

Here, the first electrode 53 is not particularly limited as long as it has conductivity and can generate an electrostatic attractive force between the first electrode 53 and the second electrode 54 by applying a voltage between the second electrode 54 of the second substrate 52 and the first electrode 53. In this embodiment, ITO (Indium Tin Oxide) is used as the material of the first electrode 53. Alternatively, a metal lamination body of an Au/Cr film (a film formed by using a chromium film as a base and a gold film is formed thereon) or the like may be used.

In addition, on the upper face of the first electrode 53, an insulating film 58 is formed. As the material of the insulating film 58, $SiO_2$, TEOS (Tetra Ethoxy Silane), or the like can be used, and, particularly, it is preferable to use $SiO_2$ that has the same optical characteristics as those of the glass substrate forming the first substrate 51. In a case where $SiO_2$ is used as the insulating film 58, there is no reflection of light and the like between the first substrate 51 and the insulating film 58, and thus, for example, as shown in FIG. 3, after the first electrode 53 is formed on the first substrate 51, the insulating film 58 may be formed on the entire face of the first substrate 51 that faces the second substrate 52 side. In addition, this insulating film 58 is a film used to prevent leakage due to discharge between the first electrode 53 and the second electrode 54 or the like and may be configured by a film that does not have transparency. In such a case, the insulating film 58 located on the mirror fixing face 512A may be eliminated.

From a part of the outer peripheral edge of the inner first electrode 531, in the etalon plan view shown in FIG. 4, an inner first electrode lead-out portion 531L is formed so as to extend toward the upper left side of the etalon 5. In addition, from a part of the outer peripheral edge of the outer first electrode 532, in the etalon plan view, an outer first electrode lead-out portion 532L is formed so as to extend toward the lower right side of the etalon 5. At the tip ends of the inner first electrode lead-out portion 531L and the outer first electrode lead-out portion 532L, an inner first electrode pad 531P and an outer first electrode pad 532P are formed, and the inner first electrode pad 531P and the outer first electrode pad 532P are connected to the voltage control unit 6 (see FIG. 1). In order to drive the electrostatic actuators 55A and 55B, voltages are applied to the inner first electrode pad 531P and the outer first electrode pad 532P by the voltage control unit 6 (see FIG. 1).

The mirror fixing portion 512, as described above, on the same axis as that of the electrode forming groove 511, is formed in a cylindrical shape having a smaller size diameter than that of the electrode forming groove 511. In addition, in this embodiment, as shown in FIG. 3, although an example is illustrated in which the mirror fixing face 512A of the mirror fixing portion 512 that faces the second substrate 52 is formed to be closer to the second substrate 52 than the electrode fixing face 511A, the invention is not limited thereto. The height positions of the electrode fixing face 511A and the mirror fixing face 512A are appropriately set based on the size of the inter-mirror gap G between the fixed mirror 56 fixed to the mirror fixing face 512A and the movable mirror 57 formed in the second substrate 52, the dimension between the first electrode 53 and the second electrode 54, and the thickness size of the fixed mirror 56 or the movable mirror 57, and are not limited to the above-described configuration. For example, in a case where the thickness size is increased by using the dielectric multi-layer mirror as the mirrors 56 and 57, a configuration in which the electrode fixing face 511A and the mirror fixing face 512A are formed on the same face or a configuration in which a mirror fixing groove having a cylindrical groove shape is formed in the center portion of the electrode fixing face 511A, and the mirror fixing face 512A is formed on the bottom face of the mirror fixing groove, or the like may be employed. In addition, it is preferable to design the groove depth of the mirror fixing face 512A of the mirror fixing portion 512 taking into account the wavelength band for which light is transmitted through the etalon 5.

In addition, the fixed mirror 56, which has a circular shape having a diameter of about 3 mm, is fixed to the mirror fixing face 512A. This fixed mirror 56 is a mirror that is formed by a dielectric multi-layer film formed from $TiO_2$—$SiO_2$ based materials in which a $TiO_2$ film and a $SiO_2$ film are laminated and is formed on the insulating film 58 formed on the mirror fixing face 512A by using a sputtering technique or the like.

Furthermore, in this embodiment, although an example is illustrated in which the dielectric multi-layer film formed from $TiO_2$—$SiO_2$ based materials is used as the fixed mirror 56, a configuration may be employed in which a mirror of an Ag alloy single layer that can cover the entire visible region as the wavelength region which can be spectrally dispersed, is used.

Here, a portion of the first substrate 51, in which the electrode forming groove 511 and the mirror fixing portion 512 are not formed, is a bonding face 513 of the first substrate 51. On the insulating film 58 formed on the bonding face 513, as shown in FIG. 3, a first bonding film 514 used for bonding is formed. As the first bonding film 514, a plasma polymer film using polyorganosiloxane as its main material or the like can be used.

3-1-2. Configuration of Second Substrate

The second substrate 52 is formed by processing a quartz crystal glass base ($SiO_2$: silicon dioxide), for example, having a thickness of 200 μm through etching.

In addition, in the second substrate 52, as shown in FIGS. 2 and 3, in the etalon plan view, a displacement portion 521 having a circle shape that has the substrate center point as its center is formed. This displacement portion 521 includes a cylinder-shaped movable portion 522 and a connection maintaining portion 523 that has the same axis as that of the movable portion 522 and maintains the movable portion 522.

This displacement portion 521 is formed by forming a groove in a flat plate-shaped glass base, which is a material forming the second substrate 52, through etching. In other words, the displacement portion 521 is formed by forming a circular ring-shaped groove portion 523A used for forming the connection maintaining portion 523 in a face of the second substrate 52 that does not face the first substrate 51 through etching.

The movable portion 522 is formed to have a thickness size larger than that of the connection maintaining portion 523. For example, in this embodiment, the movable portion 522 is formed to have a thickness size of 200 μm that is the same as the thickness size of the second substrate 52. In addition, the movable portion 522 includes a movable face 522A parallel to the mirror fixing portion 512 on a face 52A located on a side facing the first substrate 51, and the movable mirror 57 is fixed to the movable face 522A.

Here, this movable mirror 57 is a mirror having the same configuration as that of the above-described fixed mirror 56, and, for example, has a circular shape having a diameter of 3 mm, and a mirror of a dielectric multi-layer film that is formed from a $TiO_2$—$SiO_2$ based material is used.

Figure 5:
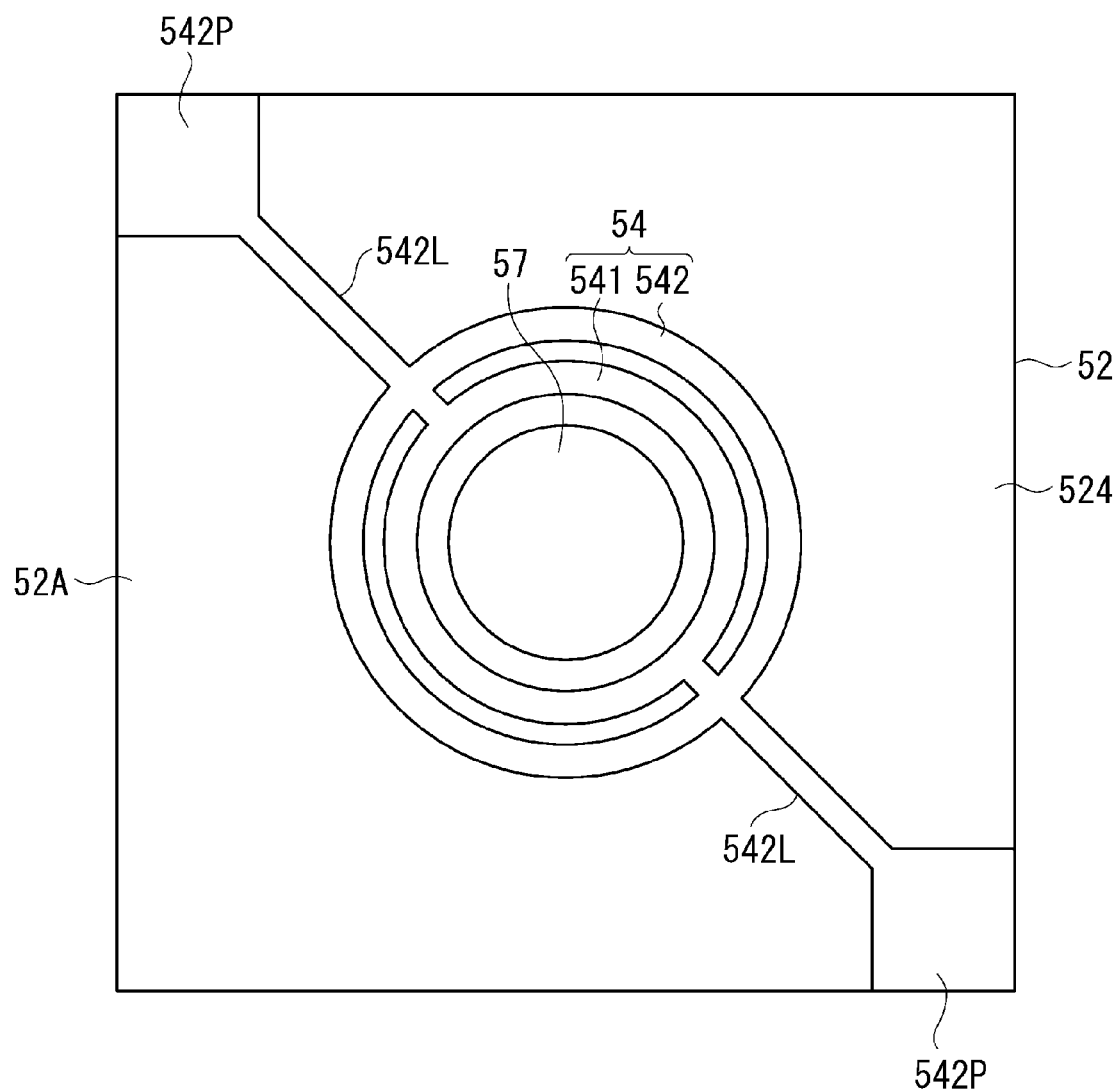
FIG. 5 is a plan view of the second substrate according to the first embodiment, as viewed from the first substrate side.

In the movable face 522A of the movable portion 522, as shown in FIGS. 3 and 5, a second electrode 54 having a double ring shape that faces the first electrode 53 with a predetermined gap interposed therebetween is formed. This second electrode 54 includes an inner second electrode 541 as an inner electrode formed so as to enclose the movable mirror 57 and an outer second electrode 542 that is formed so as to enclose the inner second electrode 541 as an outer electrode. Here, the first electrostatic actuator 55A is configured by the inner first electrode 531 and the inner second electrode 541, and the second electrostatic actuator 55B is configured by the outer first electrode 532 and the outer second electrode 542.

The inner second electrode 541, in the etalon plan view (a plan view of the second substrate 52 viewed on the first substrate 51 side) shown in FIG. 5, is formed in a ring shape having the center of the movable mirror 57 as its center point. The outer second electrode 542, on the same axis as that of the inner second electrode 541 in the etalon plan view, is formed in a ring shape having a larger size diameter than that of the inner second electrode 541 and is connected to the inner second electrode 541.

In addition, a metal-laminated body formed from ITO (Indium Tin Oxide) or an Au/Cr film is used for the second electrode 54.

In addition, from a part of the outer peripheral edge of the outer second electrode 542, one pair of second electrode lead-out portions 542L are formed to extend in opposite directions, and a second electrode pad 542P is formed at the tip end of the second electrode lead-out portion 542L. More specifically, the second electrode lead-out portion 542L, in the etalon plan view shown in FIG. 5, extends toward the upper left side and the lower right side of the etalon 5 and is formed to have point-symmetry with respect to the planar center of the second substrate 52.

In addition, the second electrode pad 542P, similarly to the inner first electrode pad 531P and the outer first electrode pad 532P, is connected to the voltage control unit 6, and, when the electrostatic actuator 55A is driven, a voltage is applied to the second electrode pad 542P.

The connection maintaining portion 523 is a circle-shaped diaphragm enclosing (encircling or circumscribing) the periphery of the movable portion 522, and, for example, is formed to have a thickness size of 30 μm that is thinner than the thickness size of the movable portion 522. Here, in the connection maintaining portion 523, as shown in FIG. 3, a film such as the second electrode 54 is not formed, and internal stress of the film does not act on the connection maintaining portion 523.

In a face 52A of the second substrate 52, an area facing the bonding face 513 of the first substrate 51 is a bonding face 524 of the second substrate 52. In this bonding face 524, similarly to the bonding face 513 of the first substrate 51, a second bonding film 525 using polyorganosiloxane as its main material is disposed.

3-2. Configuration of Voltage Control Unit

The voltage control unit 6 controls the voltages to be applied to first and second electrodes 53 and 54 of the electrostatic actuators 55A and 55B based on a control signal that is input from the control device 4.

4. Configuration of Control Device

The control device 4 controls the overall operation of the colorimetric apparatus 1. As the control device 4, for example, a general-purpose personal computer, a portable information terminal, a colorimetry-dedicated computer, or the like may be used.

As shown in FIG. 1, the control device 4 includes a light source control unit 41, a colorimetric sensor control unit 42, a colorimetric processing unit 43 (analysis processing unit), and the like.

The light source control unit 41 is connected to the light source device 2. In addition, the light source control unit 41 outputs a predetermined control signal to the light source device 2, for example, based on a setting input from a user and emits white light having a predetermined brightness level from the light source device 2.

The colorimetric sensor control unit 42 is connected to the colorimetric sensor 3. In addition, the colorimetric sensor control unit 42 sets the wavelength of the light to be received by the colorimetric sensor 3, for example, based on a setting input from a user and outputs a control signal for the purpose of detecting the amount of received light having the wavelength to the colorimetric sensor 3. As a result, the voltage control unit 6 of the colorimetric sensor 3 sets the voltages applied to the electrostatic actuators 55A and 55B based on the control signal such that light having the wavelength desired by a user is transmitted.

The colorimetric processing unit 43 changes the inter-mirror gap of the etalon 5 by controlling the colorimetric sensor control unit 42, thereby changing the wavelength of light transmitted through the etalon 5. In addition, the colorimetric processing unit 43 acquires an amount of light transmitted through the etalon 5 based on a reception signal input from the light receiving element 31. Then, the colorimetric processing unit 43 calculates the chromaticity of light reflected by the test target A based on the amount of received light of each wavelength acquired as above.

5. Operation and Advantage of First Embodiment

According to the above-described etalon 5 of the first embodiment, the following advantages are acquired.

Since the second electrode 54 is disposed on a portion of the second substrate 52 other than the connection maintaining portion 523, the internal stress of the second electrode 54 does not act on the connection maintaining portion 523. Accordingly, the connection maintaining portion 523 having the low rigidity of the second substrate 52 can be prevented from being influenced by the internal stress of the second electrode 54, whereby the bending of the second substrate 52 that occurs due to the internal stress can be decreased. Therefore, the bent state of the reflective film due to the bending of the substrate can be suppressed, whereby the resolving power of the etalon 5 can be improved.

In the connection maintaining portion 523, there is no formation of a film including the second electrode 54, and accordingly, the diaphragm that is the connection maintaining portion 523 enclosing the periphery of the movable portion 522 may easily bend, whereby the driving control of the diaphragm at the time of applying driving voltages to the first electrode 53 and the second electrode 54 can be easily performed.

In addition, since the first electrode 53 is covered with the insulating film 58, current leakage between the first electrode 53 and the second electrode 54 due to discharge or the like can be reliably prevented, whereby desired electric charge according to the set voltages can be maintained in the first electrode 53 and the second electrode 54. Accordingly, the gap G interval between the fixed mirror 56 and the movable mirror 57 can be controlled with high precision, whereby light of a desired wavelength can be satisfactorily emitted from the etalon 5.

Furthermore, since application voltages for each of the electrostatic actuators 55A and 55B can be controlled by the voltage control unit 6, setting of the gap can be performed with high precision.

Second Embodiment

Hereinafter, a second embodiment according to the invention will be described with reference to FIG. 6.

The second electrode 54 included in the above-described etalon 5 according to the first embodiment is formed in the movable portion 522.

In contrast to this, in the second electrode 54 included in the etalon of this embodiment, an inner second electrode 541 is formed on the inner side of a connection maintaining portion 523, that is, on a movable portion 522, and an outer second electrode 542 is formed on the outer side of a connection maintaining portion 523. In addition, on a face 52B of the second substrate 52 located on a side opposite to the first substrate 51, an anti-bending film 59 that has transparency is disposed.

In addition, in the description presented below, the same reference numerals are assigned to the same constituent elements as those of the first embodiment, and the description thereof will not be repeated.

Figure 6:
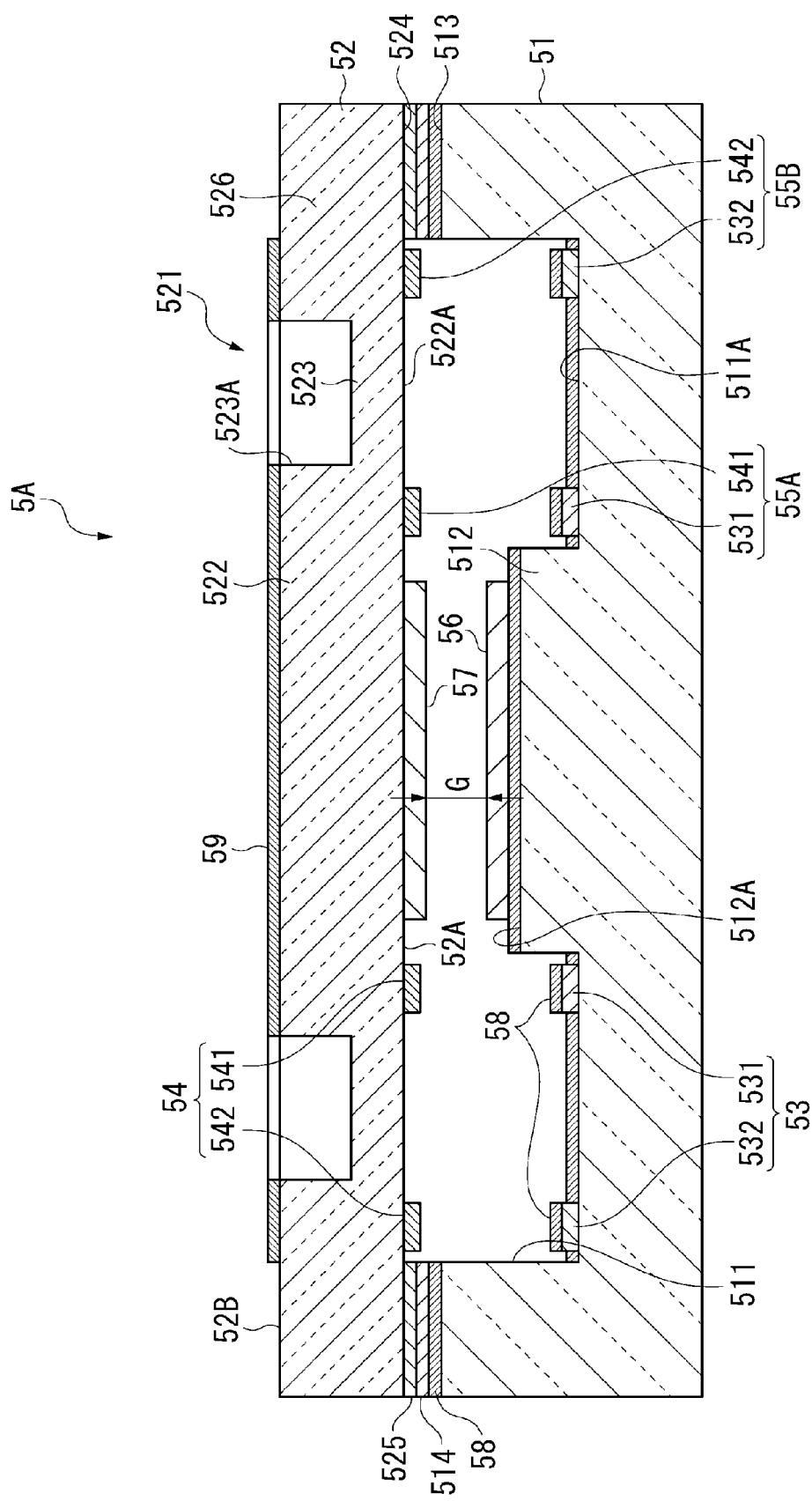
FIG. 6 is a cross-sectional view showing a schematic configuration of an etalon according to a second embodiment of the invention.

FIG. 6 is a cross-sectional view showing a schematic configuration of the etalon of this embodiment.

In this etalon 5A, a displacement portion 521 of the second substrate 52, as shown in FIG. 6, includes a movable portion 522, the connection maintaining portion 523 that maintains the movable portion 522, and a support portion 526 that supports the connection maintaining portion 523 from the outer side of the connection maintaining portion 523.

The movable portion 522 and the connection maintaining portion 523 are configured similarly to those of the first embodiment. In other words, the connection maintaining portion 523 is a circle-shaped diaphragm enclosing (encircling or circumscribing) the periphery of the movable portion 522, and the movable portion 522 is formed so as to have a thickness size larger than the connection maintaining portion 523.

The support portion 526 is a portion of the second substrate 52 that is located on the outer side of the connection maintaining portion 523 and is configured by a portion that faces the electrode fixing face 511A of the first substrate 51. This support portion 526 is formed to have a thickness size larger than that of the connection maintaining portion 523, and, for example, the thickness size thereof is formed to be 200 μm that is the same size as the thickness size of the second substrate 52.

A second electrode 54 includes a ring-shaped inner second electrode 541 disposed on the movable portion 522 and a ring-shaped outer second electrode 542 disposed on the support portion 526 and enclosing the periphery of the connection maintaining portion 523. In correspondence with the second electrode 54, a first electrode 53 is disposed at a position at which an inner first electrode 531 faces the inner second electrode 541, and at a position at which an outer first electrode 532 faces an outer second electrode 542.

An anti-bending film 59 is formed at a position (the upper face of the movable portion 522 and the upper face of the support portion 526) on the face 52B of the second substrate 52 covering the movable mirror 57 and the second electrode 54. The anti-bending film 59 is configured by a material having the same refractive index as that of the second substrate 52, and, in this embodiment, is configured by a quartz crystal glass material ($SiO_2$: silicon dioxide) that is the same as that of the second substrate 52. This anti-bending film 59 decreases the bending of the second substrate 52 that convexly bends toward the first substrate 51 due to internal stress (in this embodiment, compressive stress) that acts in the facial direction of the movable mirror 57 and the second electrode 54 when the movable mirror 57 and the second electrode 54 are formed as films on a face of the second substrate 52 that faces the first substrate 51.

In other words, when the second electrode 54 or the movable mirror 57 is formed as a film on the face 52A of the second substrate 52 that faces the first substrate 51, the second substrate 52 tends to be bent toward the first substrate 51 side due to the internal stress (compressive stress) of the second electrode 54 or the movable mirror 57.

Here, in a case where the movable mirror 57 is a dielectric multi-layer film that is formed from a $TiO_2$—$SiO_2$ based material, the sum of the products of the internal stress and the thickness size of each layer (the $TiO_2$ layer and the $SiO_2$ layer) of the movable mirror 57 and the area of each layer in the plan view acts on the second substrate 52 as bending moment. When the bending moment of the movable mirror 57 acting on the second substrate 52 is M1, the internal stress of the entire movable mirror 57 is σ1, the total thickness size of the movable mirror 57 is T1, the area of the movable mirror 57 in the etalon plan view is S1, the internal stress of each $TiO_2$ layer is σ11, the thickness size of the $TiO_2$ layer is T11, the layer number of the $TiO_2$ layers is N11, the internal stress of each $SiO_2$ layer is σ12, the thickness size of the $SiO_2$ layer is T12, and the layer number of $SiO_2$ layers is N12, the following Equation (1) is satisfied.

$$M1 \propto \sigma1 \times T1 \times S1 = (\sigma11 \times T11 \times N11 \times S1) + (\sigma12 \times T12 \times N12 \times S1) \quad (1)$$

In this embodiment, the internal stress of the movable mirror 57, the second electrode 54, and the anti-bending film 59 may be set so as to be compressive stress such that the internal stress σ1 of the entire movable mirror 57 is compressive stress, for example, even in a case where the internal stress of the $TiO_2$ layer and the internal stress of the $SiO_2$ layer of the movable mirror 57 are tensile stress and compressive stress. Then, the bending moment M1 acquired by using Equation (1) described above acts as a force for bending the second substrate 52 from the movable mirror 57.

Similarly, when the bending moment of the second electrode 54 acting on the second substrate 52 is M2, the internal stress of the second electrode 54 is σ2, the thickness size of the second electrode 54 is T2, and the area of the second electrode 54 is S2 in the etalon plan view, the following Equation (2) is satisfied.

$$M2 \propto \sigma2 \times T2 \times S2 \quad (2)$$

Then, the bending moment M2 acquired by using Equation (2) described above acts as a force for bending the second substrate 52 from the second electrode 54.

As described above, in a case where the internal stress σ1 of the movable mirror 57 and the internal stress σ2 of the second electrode 54 are compressive stress applied in the same direction, a bending moment M3 as represented in the following Equation (3) acts on the second substrate 52 so as to be a force for bending the second substrate 52 to the first substrate 51 side.

$$M3 = M1 + M2 \quad (3)$$

The anti-bending film 59 is a film disposed for negating the bending moment M3, which is acquired by using Equation (3) described above, acting on the second substrate 52 and has internal stress (compressive stress) applied in the same direction as that of the internal stress (compressive stress) acting in the facial direction of the second electrode 54 and the movable mirror 57. In addition, the anti-bending film 59, as described above, is disposed on the face 52B located on a side opposite to the face 52A on which the second electrode 54 and the movable mirror 57 are disposed. Accordingly, the bending moment acting on the second substrate 52 in accordance with the internal stress of the anti-bending film 59 works in a direction in which the second substrate 52 is separated away from the first substrate 51.

Here, when the bending moment of the anti-bending film 59 acting on the second substrate 52 is M4, the internal stress (compressive stress) of the anti-bending film 59 is σ4, the thickness size of the anti-bending film 59 is T4, and the area of a portion overlapping the gap forming portion in the etalon plan view is S4, a bending moment M4 acquired by the following Equation (4) acts on the second substrate 52. Thus, by forming the anti-bending film 59 such that the bending moment M4 has the relation of the following Equation (5), the bending moment M3 acting on the second substrate 52 is negated by the second electrode 54 and the movable mirror 57, whereby the bending of the second substrate 52 can be cleared.

$$M4 \propto \sigma4 \times T4 \times S4 \quad (4)$$

$$M4 = M3 \quad (5)$$

According to the above-described etalon 5 of the second embodiment, in addition to the above-described advantages of the first embodiment, the following advantages are acquired.

Since only the inner second electrode 541 out of the second electrodes 54 is disposed on the movable portion 522, the weight applied to the movable portion 522 can be suppressed compared to a case where the inner second electrode 541 and the outer second electrode 542 of the second electrode 54 are both disposed on the movable portion 522. Thus, since the inertia of the movable portion 522 can be low, the responsiveness of the movable mirror 57 at a time when it is driven can be improved.

In addition, since the inner second electrode 541 is disposed on the movable portion 522, and the outer second electrode 542 is disposed on the support portion 526, the internal stress of the second electrode 54 acting on the movable portion 522 can be lower than that of the case where both the electrodes 541 and 542 are disposed on the movable portion 522. Accordingly, the bent state of the movable portion 522 can be prevented, whereby the flatness of the movable mirror 57 can be improved.

Here, since the anti-bending film 59 is formed on the side of the second substrate 52 that is located opposite to the side facing the first substrate 51, and, when the film is formed, compressive stress is applied in the facial direction of the anti-bending film 59. Accordingly, in accordance with the compressive stress acting in the facial direction of the anti-bending film 59, the second substrate 52 is convexly bent toward the side opposite to the first substrate 51, and accordingly, the convex bending of the second substrate 52 toward the first substrate 51 can be decreased.

In addition, the bending moment M3 acting on the second substrate 52 at the time of forming the second electrode 54 and the movable mirror 57 in the second substrate 52 as films is set such as to be the same as the bending moment M4 acting on the second substrate 52 at the time of forming the anti-bending film 59 on the second substrate 52 (see Equation (5)). Accordingly, the bending moment M3 acting on the second substrate 52 at the time of forming the second electrode 54 and the movable mirror 57 as films in the second substrate 52 can be negated by the bending moment M4 acting on the second substrate 52 of the anti-bending film 59. Accordingly, the bending of the second substrate 52 in the initial state can be reliably prevented, the gap G interval between the fixed mirror 56 and the movable mirror 57 can be set with high precision, whereby the resolving power of the etalon 5A can be improved further.

Since the anti-bending film 59 is formed from the quartz crystal glass member ($SiO_2$) that is the same optical characteristics as those of the second substrate 52, the light incident to the second substrate 52 can be prevented from being reflected at the bonding face between the anti-bending film 59 and the second substrate 52. Accordingly, light of a specific wavelength can be well transmitted from the incident light.

In addition, since the thickness size of the movable portion 522 is increased in accordance with the formation of the anti-bending film 59, the rigidity of the movable portion 522 is increased so as to be not easily bent. Accordingly, the bending of the movable mirror 57 can be prevented more reliably.

In the connection maintaining portion 523 of the second substrate 52, formation of a film including the second electrode 54 is not performed. Accordingly, even in a case where the balance of the stress collapses due to the unbalance of the thickness or the internal stress of the second electrode 54, the movable mirror 57, and the anti-bending film 59, the internal stress due to the film formation does not act on the connection maintaining portion 523. Accordingly, the bending of the second substrate 52 due to the internal stress of the second electrode 54, the movable mirror 57, and the anti-bending film 59 can be suppressed to be minimal.

Modification of Embodiment

The invention is not limited to the above-described embodiments, and, modifications, improvements, and the like in the scope attaining the object of the invention belong thereto.

Figure 7:
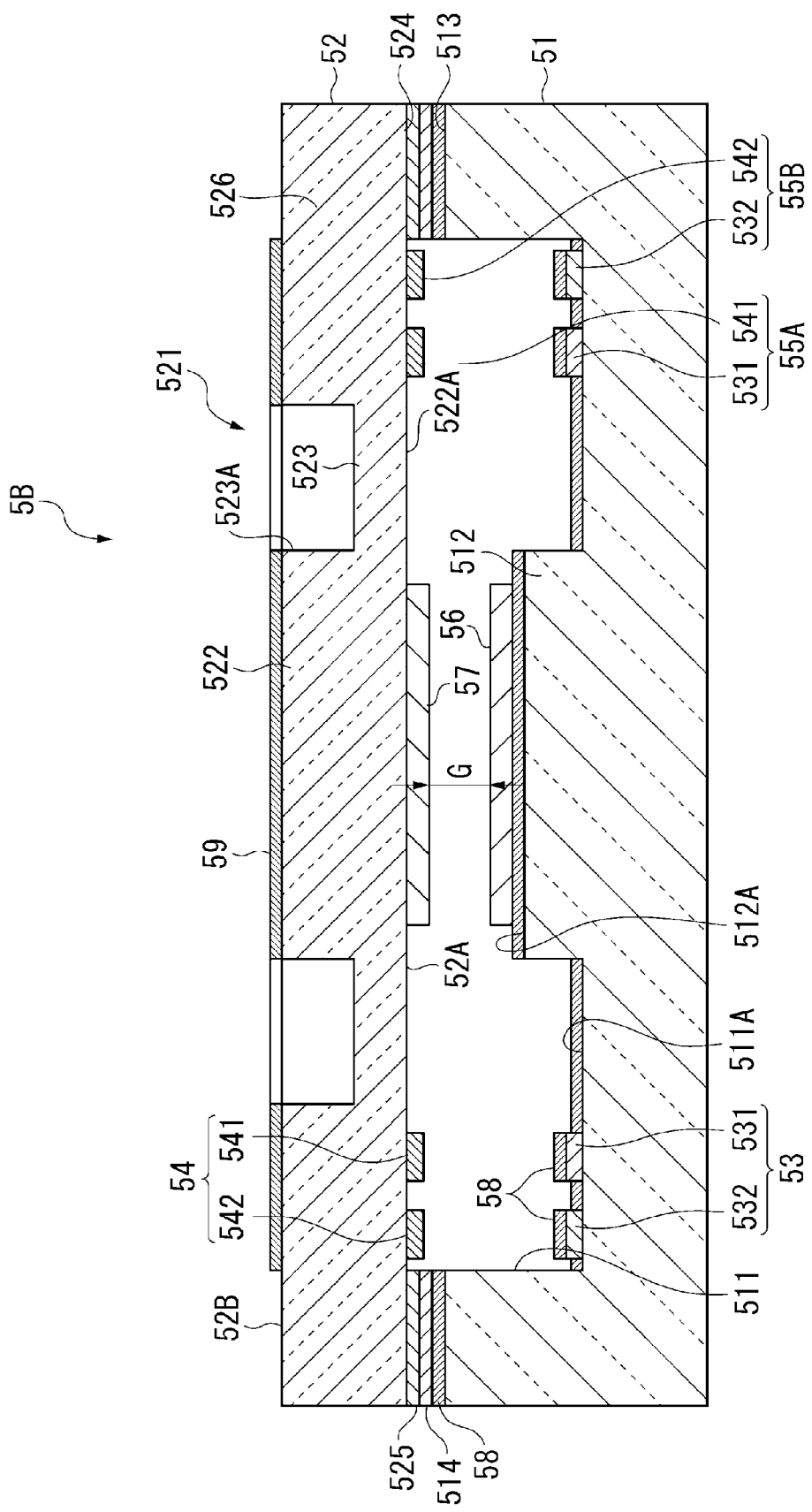
FIG. 7 is a diagram showing a modified example according to the invention.

In the above-described first embodiment, the inner second electrode 541 and the outer second electrode 542 configuring the second electrode 54 are disposed on the movable portion 522, and, in the above-described second embodiment, the inner second electrode 541 is disposed on the movable portion 522, and the outer second electrode 542 is disposed on the support portion 526. However, the invention is not limited thereto. For example, as shown in FIG. 7, in the etalon 5B, the inner second electrode 541 and the outer second electrode 542 may both be disposed on the support portion 526.

In addition, in the above-described embodiments, although the first electrode 53 and the second electrode 54 are formed in a double-ring shape, the shape of the electrodes 53 and 54 are not limited thereto. The first electrode 53 and the second electrode 54 may be in the shape of a single ring or a multiple ring shape having three rings or more.

In the above-described second embodiment, although the second electrode 54, the movable mirror 57, and the anti-bending film 59 are formed as films on the second substrate 52 such that the internal stress acting thereon is compressive stress, they may be formed as films so as to allow tensile stress to act thereon. Even in such a case, the second electrode 54, the movable mirror 57, and the anti-bending film. 59 may be formed such that the direction of the internal stress acting thereon is the same.

In the above-described second embodiment, although the anti-bending film 59 is formed at a position covering the movable mirror 57 and the second electrode 54 on the face 52B of the second substrate 52 that is located on the side opposite to the first substrate 51, the anti-bending film 59 may be formed on the entire face of the face 52B of the second substrate 52 except for the connection maintaining portion 523.

In the above-described embodiments, although the insulating film 58 is formed only on the first electrode 53, the insulating film 58 may also be formed on the second electrode 54. In such a case, the second electrode 54, the movable mirror 57, the insulating film 58, and the anti-bending film 59 may be formed such that the direction of the internal stress acting on the second electrode 54, the movable mirror 57, the insulating film 58, and the anti-bending film 59 is the same, and the bending moment is balanced.

By also forming the insulating film 58 on the second electrode 54, the current leakage between the first electrode 53 and the second electrode 54 due to discharge or the like can be reliably prevented. Accordingly, a desired electric charge according to set voltages can be maintained in the first electrode 53 and the second electrode 54. Therefore, the gap interval between the fixed mirror 56 and the movable mirror 57 can be controlled with high precision, whereby light of a desired wavelength can be emitted with high precision from the etalon 5.

In addition, in the above-described embodiments, although the fixed mirror 56 and the movable mirror 57 are formed in a circular shape, the shapes of the fixed mirror 56 and the movable mirror 57 are not limited thereto. The fixed mirror 56 and the movable mirror 57 can be formed in shapes according to the use thereof and, for example, may be formed in a rectangular shape.

In the above-described embodiments, although bonding is performed by using the first bonding film 514 and the second bonding film 525 at the bonding faces 513 and 524, the invention is not limited thereto. For example, a configuration may be employed in which bonding is performed through so-called room-temperature activation bonding, in which bonding is performed by activating the bonding faces 513 and 524 without forming the first bonding film 514 and the second bonding film 525 and overlapping and pressing the activated bonding faces 513 and 524, and any bonding method may be used.

What is claimed is:

1. A variable wavelength interference filter comprising:
a first substrate;
a second substrate that faces the first substrate;
a first reflective film that is disposed between the first substrate and the second substrate;

a second reflective film that is disposed between the first reflective film and the second substrate, a gap existing between the first reflective film and the second reflective film;
a first electrode that is disposed between the first substrate and the second substrate;
a second electrode that is disposed between the first electrode and the second substrate;
the second substrate having a first portion and a second portion, the second portion being disposed so as to surround the first portion, the first portion having a first face and a second face, and the second portion having a third face and a fourth face, the first face continuing to the third face,
the first face being opposed to the first substrate and the second face, the third face being opposed to the first substrate and the fourth face, and a first distance between the first face and the second face being larger than a second distance between the third face and the fourth face,
the second electrode being disposed between the second face and the first substrate,
looking from a direction from the first substrate toward the second substrate, the second reflective film, the first electrode, and the second electrode overlapping to the first portion.

2. The variable wavelength interference filter according to claim 1,
the first substrate having a third portion and a fourth portion, the fourth portion being disposed so as to surround the third portion,
looking from a direction from the first substrate toward the second substrate, the first portion overlapping to the third portion, the first electrode overlapping to the fourth portion.

3. The variable wavelength interference filter according to claim 1,
the second portion surrounding a circumference of the first portion continuously.

4. The variable wavelength interference filter according to claim 1, further comprising:
a first film that decreases bending of the second substrate, the first film and the second reflective electrode being disposed so as to sandwich the first portion.

5. The variable wavelength interference filter according to claim 1,
the gap changing by changing applied voltage between the first electrode and the second electrode.

6. The variable wavelength interference filter according to claim 1, further comprising:
a third electrode that is disposed between the first substrate and the second substrate; and
a fourth electrode that is disposed between the third electrode and the second substrate,
the first electrode being disposed between the first reflective film and the third electrode, and
the second electrode being disposed between the second reflective film and the fourth electrode.

7. The variable wavelength interference filter according to claim 1,
the second portion being disposed between the first portion and a fifth portion of the second substrate,
the fifth portion connecting to the first substrate via a first bonding film.

8. A substrate of a variable wavelength interference filter comprising:
a first substrate;
a first reflective film that is disposed at a first side of the first substrate;
a first electrode that is disposed at the first side of the first substrate; and
the first substrate having a first portion and a second portion, the second portion being disposed so as to surround the first portion, the first portion having a first face and a second face, the second portion having a third face and a fourth face, the first face continuing to the third face,
the first face being opposed to the second face, the third face being opposed to the fourth face, and a first distance between the first face and the second face is larger than a second distance between the third face and the fourth face,
looking from a direction from the first substrate toward the first reflective film, the first reflective film and the first electrode overlapping the first face.

9. The substrate of a variable wavelength interference filter according to claim 8, further comprising:
a first film that decreases bending of the first substrate, the first film and the first reflective electrode being disposed so as to sandwich the first portion.

10. An optical module comprising:
a variable wavelength interference filter according to claim 1.

11. An optical analyzer comprising:
a variable wavelength interference filter according to claim 1.

12. A variable wavelength interference filter comprising:
a first substrate;
a second substrate that faces the first substrate;
a first reflective film that is disposed between the first substrate and the second substrate;
a second reflective film that is disposed between the first reflective film and the second substrate, a gap existing between the first reflective film and the second reflective film;
a first electrode that is disposed between the first substrate and the second substrate; and
a second electrode that is disposed between the first electrode and the second substrate;
wherein the second substrate has a first portion and a second portion, the second portion is disposed so as to surround the first portion, the first portion has a first face and a second face, and the second portion has a third face and the second face,
the first face is opposed to the first substrate and the second face, and a first distance between the first face and the second face is larger than a second distance between the third face and the second face,
the second electrode is disposed between the second face and the first substrate, and
looking from a direction from the first substrate toward the second substrate, the second reflective film, the first electrode, and the second electrode overlap the first portion.

13. The variable wavelength interference filter according to claim 12, wherein, looking from a direction along the second surface, the second electrode overlaps the second reflective film.

14. The variable wavelength interference filter according to claim 12, wherein the second face is disposed between the first face and the first substrate.

15. The variable wavelength interference filter according to claim 12, wherein the first face is entirely co-planar with the third face.

16. The variable wavelength interference filter according to claim 1, wherein the first face is entirely co-planar with the third face.

17. The substrate of a variable wavelength interference filter according to claim 8, wherein the first face is entirely co-planar with the third face.

\* \* \* \* \*